Oct. 4, 1955          C. M. O'LEARY          2,719,442
POWER TRANSMISSION UNIT
Filed Nov. 21, 1951          2 Sheets-Sheet 1
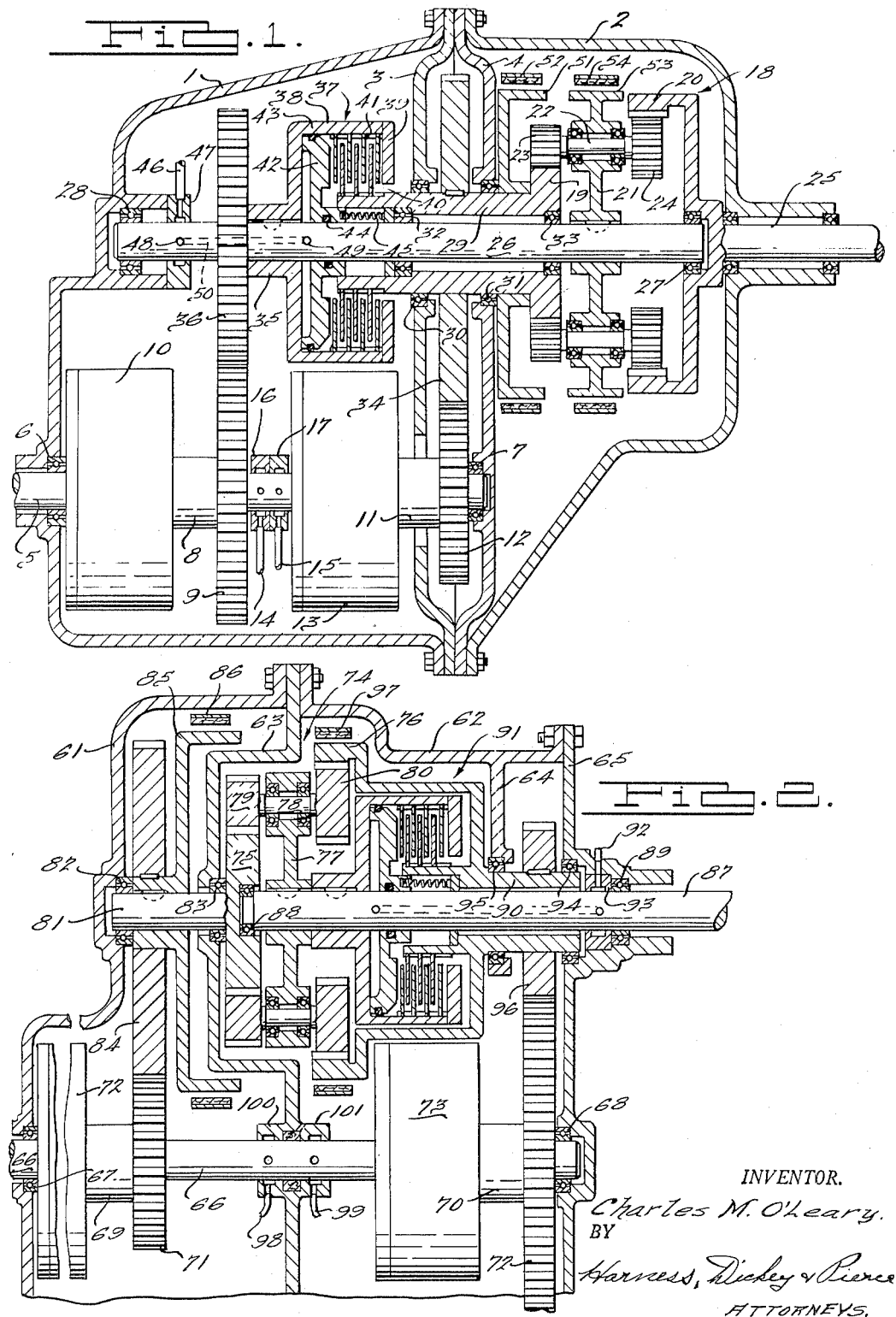
INVENTOR.
Charles M. O'Leary.
BY
Harness, Dickey & Pierce
ATTORNEYS.

United States Patent Office 2,719,442
Patented Oct. 4, 1955

2,719,442

POWER TRANSMISSION UNIT

Charles M. O'Leary, Los Angeles, Calif.

Application November 21, 1951, Serial No. 257,545

3 Claims. (Cl. 74—765)

The present invention relates to change-speed power transmissions.

Change-speed transmissions which are driven by hydrokinetic torque converters to extend the speed ratio range of the converter without causing the converter to operate at inefficient speed ratios are preferably provided with means to change speed ratios in steps which differ from each other to a greater extent than the successive steps required in a transmission that is driven directly by an internal combustion engine. For many types of hydrokinetic torque converters, the successive speed ratio steps provided by the transmission preferably differ to the extent that each ratio is approximately one-half or twice each next closest ratio. A similar relationship is desirable in transmissions used for driving ship propellers, even though no hydrokinetic torque converter is used. Some latitude may be allowed in this two to one relationship and, therefore, when it is stated herein that the relationship between two speed ratios is approximately two to one, it is meant that the relationship may range from a ratio of one and two-thirds to one to a ratio of two and a half to one. For most applications, however, the best results are obtained if the two to one relationship between successive speed ratios is maintained within a tolerance of plus or minus ten per cent and this range is meant by the expression to the effect that the ratio between successive steps is substantially two to one.

The general object of the invention is to provide simple and practical four-speed transmissions in which one or two of the speed ratios may be reverse drives or all may be forward drives.

A further object is to provide transmissions of the above type in which each drive ratio is either approximately one-half or twice each next adjacent ratio in the same direction.

A further object of the present invention is to provide a transmission of the above type involving the use of a planetary gear set and constant mesh gears, so that all of the changes in drive ratios are effected by operation of friction clutches and brake bands.

A further object is to provide several specifically different transmissions having the above-stated characteristics and embodying the same basic principles of construction.

Further objects and advantages of the invention will become apparent from the following specification, the accompanying drawings and the appended claims.

In the drawings:

Figure 1 is a longitudinal sectional view through one form of transmission embodying the present invention;

Figure 2 is a longitudinal section through a further embodiment of the invention.

Figure 3:
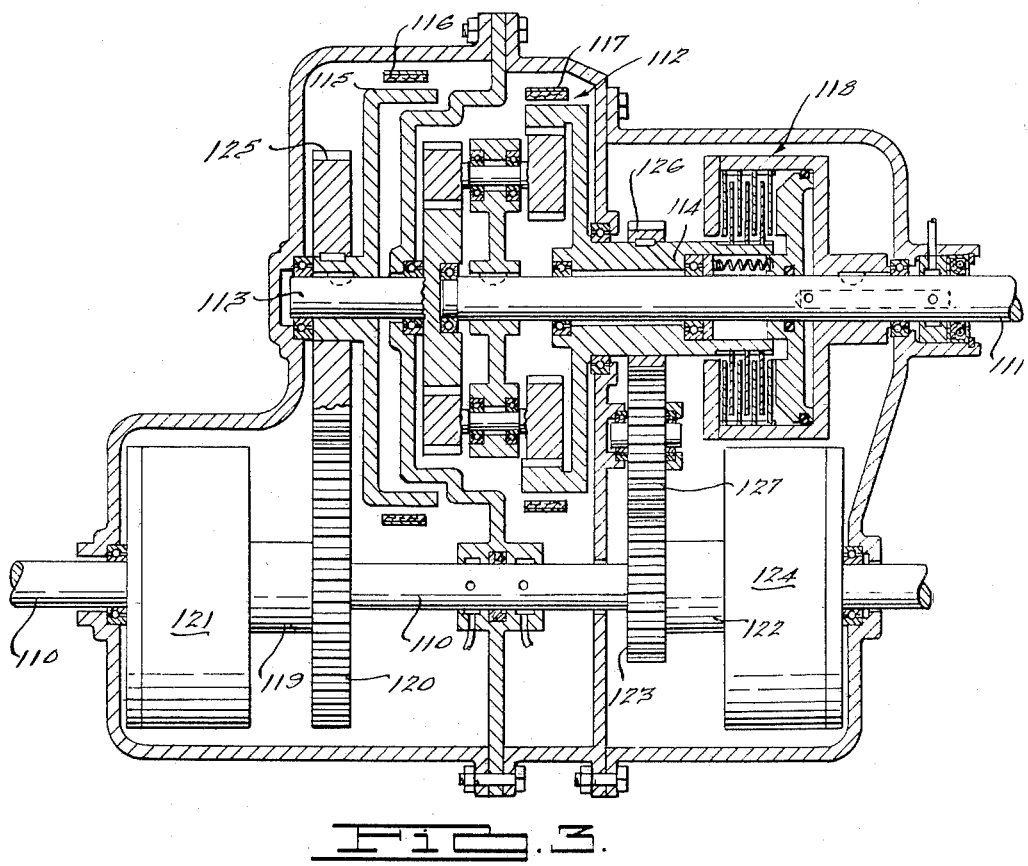
Figure 3 is a longitudinal section through a third form of the invention.

The form of power transmission illustrated in Figure 1 is particularly adapted for use in trucks and other heavy vehicles and is capable of providing three different forward speed ratios in which the ratio of the speed of the input shaft to that of the output shaft may be two to one, one to one or a one to two overdrive. The reverse speed ratio is two to one.

The transmission of Figure 1 includes a casing formed of a pair of sections 1 and 2 which are bolted together against a pair of inner webs 3 and 4. A power input shaft 5 is journaled at its left-hand end in the left end wall of the casing and is journaled at its opposite end on a web 4 by suitable bearings 6 and 7, respectively. A sleeve 8 is freely journaled for rotation on the shaft 5 and carries a driving gear 9. The sleeve may be clutched to the shaft 5 by operation of a hydraulic clutch 10 of any suitable construction. A second sleeve 11 is also freely journaled on the shaft 5 and carries a driving gear 12. The sleeve 11 may be clutched to the shaft 5 by operation of a hydraulically operated clutch 13, of any suitable construction. Hydraulic fluid for operating the clutches 10 and 13 may be supplied by means of pipes 14 and 15, respectively, which communicate with manifolds 16 and 17 surrounding the shaft 5 and having fluid communication through suitable drilled openings in the shaft to the interior of the clutches 10 and 13. As a result of the construction thus far described, either the gear 9 or the gear 12 may be clutched to the power input shaft 5. The transmission includes a planetary gear transmission, indicated generally at 18, consisting of three interconnected geared elements, namely a sun gear 19, a ring gear 20 and a plurality of planet cluster gears carried by a cage member 21. Each planet cluster includes a shaft 22 journaled on the cage 21 and carrying a small planet gear 23 meshing with the sun gear 19 and a larger planet gear 24 meshing with the ring gear 20. The ring gear 20 is carried by a power output shaft 25. The planet cage is fixed to a central shaft 26, one end of which is journaled by bearings 27 within the inner end of an enlarged portion of the power output shaft 25. The opposite end of the shaft 26 is journaled by means of bearings 28 in the left-hand end wall of the main casing. The sun gear 19 is fixed to a tubular shaft 29, which is journaled by means of bearings 30 and 31 on the webs 3 and 4, respectively, and in turn supports bearings 32 and 33, which journal the central portion of the shaft 26.

The tubular shaft 29 has fixed thereto a gear 34, which is in constant mesh with the gear 12. A sleeve 35 is fixed on the shaft 26 by suitable means and carries a gear 36, which is in constant mesh with the gear 9. Sleeve 35 and tubular shaft 29 may be connected together by means of a hydraulically-operated clutch, indicated generally at 37, thus locking up the planetary transmission 18. While any suitable form of clutch may be employed for this purpose, the particular type illustrated includes a main housing portion 38 fixed to the sleeve 35 and carrying an end plate 39. The left-hand extremity of the tubular shaft 29 projects within the housing 38 and is provided with splines, on which are fitted a plurality of axially-movable clutch plates 40. Intermediate the clutch plates 40 are provided a plurality of clutch plates 41 which are splined to the interior of the housing 38 in such a manner that they can move axially relative to the housing. The housing 38 encloses an annular piston 42 provided with an O-ring type of seal 43 at its outer periphery and a similar O-ring seal 44 at its inner periphery. A plurality of coil springs 45 normally operate to hold the piston 42 in its left-hand position, illustrated in the drawings.

When fluid under pressure is admitted to the space at the left-hand side of the piston 42, the piston is advanced forwardly and presses the clutch plates 40 and 41 together between the piston and the end wall 39 of the housing 38, thus establishing a driving connection between the gear 36 and the tubular shaft 29.

Fluid for operating the clutch 37 is provided by means of a pipe 46 connected to a manifold 47 surrounding the shaft 26. A pair of transverse openings 48 and 49 in the shaft 26 are connected by an axial passage 50, thus connecting the pipe 46 to the space within the housing 38 at the left-hand side of the piston 42.

The clutch mechanisms 10 and 13, previously described, may be of the same construction as the clutch 37 and are operated in a similar manner.

A tubular shaft 29 is provided with a brake flange 51 and a brake band 52 which is actuated by any suitable means, not shown, is provided to engage the flange 51 and thus hold the tubular shaft 29 against rotation. The planet cage 21 is provided with a brake flange 53 having a similar brake band 54 that is actuated by suitable means, not shown, to hold the planet cage against rotation.

In the form of transmission shown in Figure 1, the planetary transmission is of such design and construction that when the shaft 26 is driven and the tubular shaft 29 is held stationary, the output shaft 25 will rotate forwardly at twice the speed of the shaft 26. When the tubular shaft 29 is driven and the shaft 26 is held stationary by means of brake band 54, the output shaft 25 is rotated in reverse but at the same speed as the shaft 26. While it is possible to employ a planetary gear set of different type and still accomplish the same drive relationships, it is preferred to employ a planetary transmission of the general type illustrated, in which event the relative diameters of the gears 20, 24, 23 and 19 are in the proportion of 15—3—2—10.

With a transmission of the type described above, the desired over-all speed ratios may be obtained by driving the shafts 26 and 29 selectively from a common shaft at two ratios, the speed ratio at which coupler shaft 29 is driven being half that at which the shaft 26 is driven from the common input shaft. Thus, in the illustrated embodiment of the invention, gears 9 and 36 are of the same size and gear 34 has a diameter twice that of gear 12. The transmission, therefore, provides the following ratios between the speeds of the input shaft 5 and the output shaft 25: The first, or highest, speed ratio is a one to two overdrive and is effected by engaging clutch 10 and brake band 52, thus driving the planet cage while the sun gear 19 is held stationary; the second speed ratio, which is a one to one ratio, is effected by engaging clutches 10 and 37, thereby locking up the planetary transmission; and the third speed is a ratio of two to one and is effected by engaging clutches 13 and 37. A reverse speed at a two to one ratio is effected by engaging the clutch 13 and the brake band 54. It will be observed that each of the three forward drive ratios is one-half or twice that of the next adjacent ratio or ratios and that the reverse ratio is the same as that of the lowest forward drive ratio. This transmission, therefore, is well suited for use in trucks and other heavy vehicles which employ a hydrokinetic torque converter. If the torque converter is so designed that it provides an automatic range of drive ratios at relatively high efficiency in which the minimum ratio within the range is one-half that of the maximum ratio, the transmission may be shifted in such a manner as to maintain the converter operating in its efficient speed ratio range at all times except when the vehicle is operating at abnormally low speeds compared with the speed of the engine.

It should be noted further that a fourth forward drive ratio of one to one and a half overdrive may also be obtained with the transmission shown in Figure 1 by simultaneously engaging the clutches 10 and 13. This ratio will ordinarily not be required in vehicle operation but may be desirable under some conditions.

In Figure 2 is illustrated a modification of the transmission capable of providing four different forward speed ratios, each of which is either one-half or twice that of the next adjacent ratio, but which is incapable of providing a reverse drive. In this modification of the invention, the same basic type of planetary transmission is provided but the power take-off is connected to the planet cage instead of the ring gear, as in Figure 1, and the sun gear and ring gear are selectively driven from the main input shaft at two speeds for a given input shaft speed, which differ from each other by the ratio of four to one.

Referring in further detail to Figure 2, the transmission incorporates a casing having a pair of sections 61 and 62 which are bolted together against an internal supporting web 63. The casing section 62 is also provided with an internal supporting web 64 and an end closure plate 65. A power input shaft 66 is journaled in the casing by suitable bearings 67 and 68 and has journaled thereon a pair of sleeves 69 and 70, which carry gears 71 and 72, respectively. The sleeve 69 may be clutched to the shaft 66 by a clutch, indicated diagrammatically at 72; while the sleeve 70 may be clutched to the shaft 66 by a similar clutch 73. The transmission incorporates a planetary transmission, indicated generally at 74, and having a sun gear 75, a ring gear 76 and a planet cage 77 on which are journaled a plurality of cluster gears. The cluster gears comprise a shaft 78 journaled on the cage and carrying a small planet gear 79 in mesh with the sun gear 75 and a larger planet gear 80 in mesh with the ring gear 76. The relative sizes of these gears in the planetary transmission may be the same as those in the transmission illustrated in Figure 1.

The sun gear 75 is mounted on a shaft 81, which is supported by a bearing 82 on the end wall of the casing and a bearing 83 supported by the web 63. The shaft 81 has fixed thereto a gear 84 in mesh with the gear 71 and a brake flange 85 having an associated brake band 86 operable by any suitable means, not shown, to hold the shaft 81 and, therefore, the sun gear 75 against rotation.

The planet cage 77 is fixed to the power output shaft 87, which is journaled by means of bearings 88 positioned within the sun gear 75 at one end and by bearings 89 carried by the right-hand end of the casing.

The sun gear 76 is connected to tubular shaft 90 by means of an intermediate housing portion of a hydraulically operated clutch, indicated generally at 91. The clutch 91, being similar in construction and operation to the clutch 37 embodied in the form of invention shown in Figure 1, need not be further described except to note that it is supplied with operating fluid by means of a pipe 92 connected to a manifold 95 surrounding the shaft 87 and in communication with suitable passageways formed in the latter shaft. The clutch 91, when engaged, connects the ring gear 76 to the output shaft 87 and thus locks up the planetary transmission.

The tubular shaft 90 is journaled by means of bearings 94 and 95 carried by the end wall 65 and the web 64 of the housing and has fixed thereto a gear 96, which is in constant mesh with the gear 72. A brake band 97 is provided for holding the ring gear 76 and tubular shaft 90 stationary, when desired.

As previously indicated, the drives between the input shaft 66 and the plantary transmission are such that for a given speed of shaft 66, the ring gear is rotated at four times the speed at which the sun gear may be rotated. This is taken care of by the relative sizes of gears 71, 84, 72 and 96. In the embodiment of the invention illustrated in Figure 2, gear 84 is twice the diameter of gear 71 and gear 72 is twice the diameter of gear 96.

The clutches 72 and 73 may be of any desired construction but, as illustrated, are the same in construction as the clutch 91 of Figure 2 and the clutch 37 of Figure 1. They are operated by fluid supplied, respectively, to pipes 98 and 99, connected, respectively, to manifolds 100 and 101. The manifolds 100 and 101 communicate with suitable passageways in the shaft 66 for conducting operating fluid to the clutches 72 and 73.

The transmission of Figure 2 will provide the following ratios between the speed of the input shaft 66 and the output shaft 87:

The first, or highest, speed ratio is a one to two overdrive and is effected by engaging clutches 73 and 91, which connect the shaft 66 directly to the output shaft 87 independently of the planetary transmission.

The second speed ratio, which is a one to one ratio, is effected by engaging the clutch 73 and the brake band 86. Under these conditions, the sun gear is held stationary and the ring gear 76 drives the planet cage 77.

The third speed, which is a two to one ratio, is effected by engaging the clutches 72 and 91. Under these conditions, the clutch 91 locks up the planetary transmission and the drive is from the sun gear through the transmission to the shaft 87, which is driven at the same speed as the sun gear.

The fourth speed, which is a four to one ratio, is provided by engaging the clutch 72 and the brake band 97. Under these conditions, the drive is from the sun gear to the planet cage, while the ring gear 76 is held stationary.

The particular form of planetary transmission employed in the form of invention shown in Figure 2 has the characteristic that the drive ratio from the ring gear to the planet cage when the sun gear is held stationary is the same as the ratio when the drive is from the sun gear to the planet cage and the ring gear is held stationary, namely a two to one ratio. Accordingly, it will be apparent that the transmission will operate in the same manner and produce the same results if both of the gears 96 and 84 are fixed to the sun gear shaft 81. In that case, the sun gear may be selectively driven at two speeds, one of which is four times that of the other, and the ring gear never acts as a driving member. Alternatively, both of the gears 84 and 96 may be mounted on the ring gear shaft 90. The preferred arrangement illustrated in Figure 2 has the advantage that it occupies less space than either of the two alternative constructions mentioned. It has the further advantage that, if desired, an additional overdrive speed ratio of one to one and a quarter may be provided by simultaneously engaging the clutches 72 and 73. This would not be possible if both of the drives from the main drive shaft 66 were connected to the same element of the planetary transmission.

The form of transmission shown in Figure 3 is substantially the same as that shown in Figure 2 except that it is modified to provide two speeds forward and two in reverse, one of the speed ratios in each direction being twice that of the other. A transmission of this type is suitable for use in propeller drives for ships. The only essential difference between the transmission of Figure 3 and that of Figure 2 is that in the transmission of Figure 3 the two selectively operable drives from the power input shaft to the planetary transmission are at the same speed ratios but one of them is a reverse drive.

Referring to Figure 3, the transmission incorporates a suitable casing made up of a number of sections bolted together, a power input shaft 110, a power output shaft 111, a planetary transmission, indicated generally at 112 and similar in construction to the transmission 74 of Figure 2, a sun gear shaft 113, a tubular ring gear shaft 114, a brake flange 115 on the shaft 113 and having a co-operating brake band 116, and a brake band 117 adapted to co-operate with the ring gear and the planetary transmission and thereby hold the ring gear and the tubular shaft 114 stationary. The transmission includes a hydraulically-operated clutch 118 adapted to clutch the tubular shaft 114 to the output shaft 111.

The construction so far described is identical in all other respects to that shown in Figure 2 except that it will be noted that the clutch 118, which connects the ring gear to the output shaft 111, is spaced from the ring gear and connected thereto by intermediate tubular shaft section 114, whereas in Figure 2 the clutch 91 is positioned between the tubular shaft 90 and the ring gear 76. This difference in arrangement has no bearing upon the function or operation of the transmission and is merely a matter of choice.

The input shaft 110 is provided with a sleeve 119 on which is mounted a gear 120. The sleeve is normally free to rotate on the shaft 110 but may be clutched thereto by means of a hydraulic clutch 121. A sleeve 122 is also free to rotate on the shaft 110 and carries a gear 123, and the sleeve may be clutched to the shaft by operation of a hydraulic clutch 124.

A gear 125, fixed to the sun gear shaft 113, is in constant mesh with the gear 120 and the gears 120 and 125 are of the same diameter. A gear 126, fixed to the tubular ring gear shaft 114, is of the same stize as the gear 123 and is connected thereto by a reverse idler gear 127, suitably journaled in the casing.

As a result of the above construction, the transmission of Figure 3 will provide two forward and two reverse drive ratios, as follows: The high forward speed ratio is established by engaging clutches 121 and 118, thus driving the shaft 111 at the same speed as shaft 110; a two to one forward drive for low is provided by engaging clutch 121 and brake band 117, thus causing the sun gear to drive the planet cage and the shaft 111 to which the cage is fixed; a reverse high speed drive is established by engaging clutches 124 and 118, the clutch 118 operating to connect the tubular shaft 114 to the output shaft 111; and low reverse speed is established by engaging clutch 124 and brake band 116, thus causing the ring gear to drive the planet cage and thus the shaft 111 while the sun gear is held stationary.

The remaining features of construction of the transmission illustrated in Figure 3 are the same as those illustrated in Figure 2 and hence need not be further described. It may be noted, however, that, as in the case of the transmission of Figure 2, both of the drives from the power input shaft 110 to the planetary transmission may be connected to the same element of the planetary transmission, namely either the sun gear or the ring gear, without in any way affecting the operation or performance of the mechanism.

It may be noted that, throughout this application, references to forward speed ratios mean ratios in which the output shaft of the transmission rotates in a direction opposite to that of the input shaft.

Power transmissions incorporating certain of the basic principles of those disclosed and claimed in the present application are disclosed in applicant's prior copending applications Serial No. 676,450, filed June 13, 1946, and Serial No. 90,473, filed April 29, 1949, both now abandoned.

While several forms of the invention are illustrated and described, it will be apparent that variations in the design and construction of various elements of the transmissions may be indulged in without departing from the spirit of the invention or the scope of the appended claims. In particular, it should be observed that while hydraulically-operated, multiple disk friction clutches are illustrated in the preferred embodiments, any suitable form of clutching device may be substituted therefor. The references inserted in the following claims to the effect that two or more selectively-operable drive connections serve to provde different speed ratios are intended to cover ratios which differ either in magnitude or in direction, i. e. a one to one forward drive ratio is considered a different ratio from a one to one reverse drive ratio.

What is claimed is:

1. A power transmission, comprising an internal gear, a spur gear mounted coaxially with respect to the internal gear, planet gears interconnecting said internal and spur gears, a planet cage journaled coaxially with said internal and spur gears and rotatably supporting said planet gears, a power output shaft connected to said internal gear, a power input shaft, independent selectively-operable driving connections between said power input shaft and said spur gear and between said input shaft and said cage, said driving connections being effective to drive said spur gear and cage at different ratios with respect to the speed of the input shaft, selectively-operable means to hold either said spur gear or said cage stationary, and means operable to prevent relative movement between said gears.

2. A power transmission, comprising an internal gear, a spur gear mounted coaxially with respect to the internal gear, planet gears interconnecting said internal and spur gears, a planet cage journaled coaxially with said internal and spur gears and rotatably supporting said planet gears, a power output shaft connected to said internal gear, a power input shaft, independent selectively-operable driving connections between said power input shaft and said spur gear and between said input shaft and said cage, said driving connections being effective to drive said spur gear and cage at different ratios with respect to the speed of the input shaft, selectively-operable means to hold either said spur gear or said cage stationary, means operable to prevent relative movement between said gears, the ratio between the two drive ratios of said driving connections being the same as the ratio beteen the speeds of rotation of said spur gear for a given speed of rotation of the cage when the spur gear is held stationary and when said gears are held against relative movement, and the driving connection of the higher ratio of driving to driven speed being the connection to the spur gear.

3. A power transmission, comprising an internal gear, a sun gear mounted coaxially with respect to the internal gear, planet gears interconnecting said internal and sun gears, a planet cage journaled coaxially with said internal and sun gears and rotatably supporting said planet gears, the proportions and arrangement of said gears being such that when the cage is driving forwardly and the sun gear is held stationary the internal gear rotates forwardly at approximately twice the speed of the cage and when the sun gear is driving forwardly and the cage is held stationary the internal gear rotates rearwardly at approximately the same speed as the sun gear, a power output shaft connected to said internal gear, a power input shaft, independent selectively-operable driving connections between said power input shaft and said sun gear and between said input shaft and said cage, said driving connections being effective to drive said sun gear and cage at different ratios with respect to the speed of the input shaft, selectively-operable means to hold either said sun gear or said cage stationary, means operable to prevent relative movement between said gears, the ratio between the two drive ratios of said driving connections being the same as the ratio between the speeds of rotation of said sun gear for a given speed of rotation of the cage when the sun gear is held stationary and when said gears are held against relative movement, and the driving connection of the higher ratio of driving to driven speed being the connection to the sun gear.

References Cited in the file of this patent

UNITED STATES PATENTS

| 1,256,362 | Rowledge | Feb. 12 1918 |
| 2,456,328 | Schneider | Dec. 14, 1938 |
| 2,464,088 | Jandasek | Mar. 8, 1949 |
| 2,555,454 | O'Leary | June 5, 1951 |
| 2,615,351 | Kelbel | Oct. 28, 1952 |
| 2,692,516 | O'Leary | Oct. 26, 1954 |

FOREIGN PATENTS

| 267,768 | Switzerland | Apr. 15, 1950 |
| 935,298 | France | June 15, 1948 |